US011246261B2

(12) United States Patent
Fukano et al.

(10) Patent No.: US 11,246,261 B2
(45) Date of Patent: Feb. 15, 2022

(54) POWER EQUIPMENT (71) Applicant: HONDA MOTOR CO., LTD., Tokyo (JP)

(72) Inventors: Jun Fukano, Wako (JP); Masato Takeda, Wako (JP); Keisuke Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 16/342,487

(22) PCT Filed: Nov. 16, 2017

(86) PCT No.: PCT/JP2017/041321
§ 371 (c)(1),
(2) Date: Apr. 16, 2019

(87) PCT Pub. No.: WO2018/097033
PCT Pub. Date: May 31, 2018

(65) Prior Publication Data
US 2021/0289699 A1 Sep. 23, 2021

(30) Foreign Application Priority Data
Nov. 25, 2016 (JP) .............................. JP2016-229549

(51) Int. Cl.
*A01D 34/82* (2006.01)
*A01D 34/69* (2006.01)
(Continued)

(52) U.S. Cl.
CPC ........... *A01D 34/826* (2013.01); *A01D 34/69* (2013.01); *A01D 34/824* (2013.01); *A01D 69/02* (2013.01); *A01D 2034/6843* (2013.01)

(58) Field of Classification Search
CPC .... A01D 34/826; A01D 34/69; A01D 34/824; A01D 69/02; A01D 2034/6843
See application file for complete search history.

(56) References Cited

U.S. PATENT DOCUMENTS 4,878,339 A 11/1989 Marier et al.
6,625,965 B2 9/2003 Wright et al.
(Continued)

FOREIGN PATENT DOCUMENTS

DE 19941104 A1 3/2001
DE 202013100236 U1 1/2013
(Continued)

OTHER PUBLICATIONS

English translation of International Search Report for International Application No. PCT/JP2017/041321, dated Feb. 20, 2018, 2 pages.
(Continued)

*Primary Examiner* — Abigail A Risic
(74) *Attorney, Agent, or Firm* — Armstrong Teasdale LLP (57) ABSTRACT Walk-behind power equipment includes: a main body including front and rear wheels; a work unit provided on the main body; a work motor that drives the work unit; a travel motor that rotates the rear wheel; a handle extending from the main body rearward and upward; a posture detector that detects a rearward tilted state of the main body in which the rear wheel is in contact with a ground and the front wheel is not; and a control unit that drive-controls the work motor and travel motor, wherein when the main body is in the rearward tilted state, the control unit causes a rotational speed of the travel motor to be reduced compared to when the front wheel is in contact with the ground, or causes a rotational speed of the work motor to be reduced compared to when the front wheel is in contact with the ground.

6 Claims, 9 Drawing Sheets (51) Int. Cl.
*A01D 69/02* (2006.01)
*A01D 34/68* (2006.01)

(56) References Cited

U.S. PATENT DOCUMENTS

| | | | |
|---|---|---|---|
| 7,146,787 B2 * | 12/2006 | Walker | A01B 51/02 |
| | | | 56/15.8 |
| 8,862,311 B2 | 10/2014 | Cho et al. | |
| 2011/0239611 A1 | 10/2011 | Maruyama et al. | |
| 2012/0238403 A1 * | 9/2012 | Koike | B60L 15/20 |
| | | | 477/1 |
| 2013/0025957 A1 * | 1/2013 | Ellsworth | A01D 34/64 |
| | | | 180/210 |
| 2015/0175190 A1 * | 6/2015 | Ito | B62D 1/12 |
| | | | 180/6.5 |
| 2016/0236640 A1 * | 8/2016 | Bartel | F16C 11/10 |
| 2017/0322559 A1 * | 11/2017 | Fukuda | G05D 1/0088 |
| 2018/0037183 A1 * | 2/2018 | Bartel | A01D 34/824 |
| 2020/0101920 A1 * | 4/2020 | Bartel | A01D 34/824 |

FOREIGN PATENT DOCUMENTS

| | | | |
|---|---|---|---|
| EP | 1219156 A1 | | 7/2002 |
| EP | 1859669 A1 | | 11/2007 |
| EP | 2974900 A1 | | 1/2016 |
| GB | 2423456 A | * | 8/2006 |
| JP | S61257114 A | | 11/1986 |
| JP | H0708033 A | | 1/1995 |
| JP | H0943269 A | | 2/1997 |
| JP | H0994023 A | | 4/1997 |
| JP | 2002017135 A | | 1/2002 |
| JP | 2006220491 A | | 8/2006 |
| JP | 2007116957 A | | 5/2007 |
| JP | 2011206018 A | | 10/2011 |
| JP | 2013238097 A | | 11/2013 |
| JP | 2014025912 A | | 2/2014 |
| JP | 2016195546 A | | 11/2016 |
| WO | 2016104187 A1 | | 10/2017 |

OTHER PUBLICATIONS

Extended European Search Report for EP Application No. 17874804.2, dated Nov. 11, 2019, 7 pages.

* cited by examiner

POWER EQUIPMENT

CROSS-REFERENCE TO RELATED APPLICATIONS

This application is a U.S. National Phase Application of PCT/JP2017/041321, filed Nov. 16, 2017, which claims the benefit of priority to JP Application No. 2016229549, filed Nov. 25, 2016, the contents of which are hereby expressly incorporated by reference in their entirety.

TECHNICAL FIELD

The present invention relates to walk-behind power equipment, such as lawn mowers, grass cutters, snow blowers, tillers, etc.

BACKGROUND ART

A walk-behind lawn mower including a main body provided with a pair of left and right front wheels and a pair of left and right rear wheels, a blade provided in a lower part of the main body, a drive source that drives the blade and the rear wheels, and a handle extending rearward and upward from the main body is known (for example, Patent Document 1). Many of such walk-behind lawn mowers are not provided with a steering mechanism. Therefore, the operator changes the direction of the main body by a turning operation including pressing down the handle to tilt the main body rearward and lift the front wheels from the ground, pushing the handle left or right in that state to change the direction of the main body, and bringing the front wheels into contact with the ground after finishing the change of the direction.

PRIOR ART DOCUMENT(S)

Patent Document(s)

Patent Document 1: JP2011-206018A

SUMMARY OF THE INVENTION

Task to be Accomplished by the Invention

In a lawn mowing operation using the aforementioned lawn mower, the operator moves the lawn mower straight forward to mow the lawn in a straight line with a predetermined mowing width, and causes the lawn mower to make a U-turn at an end of the field through the above-described turning operation. At this time, it is preferred to control the direction and position of the lawn mower accurately such that an edge of the next swath overlaps with an edge of the previous swath, and the next travel path is in parallel with the previous travel path. However, because the rear wheels are rotated by the power from the drive source during the turning operation also, the operator is required to have a certain level of skill to properly operate the lawn mower. In addition, there is a problem that in the turning operation, the blade is moved away from the ground and exposed, and therefore, the noise due to driving of the blade becomes large. Thus, there is a problem in the power equipment such as a walk-behind lawn mower in regard to commercial acceptability such as operability and noise level during turning operation.

In view of the above background, an object of the present invention is to improve commercial acceptability of walk-behind power equipment during turning operation.

Means to Accomplish the Task

To achieve the above object, one embodiment of the present invention provides a walk-behind power equipment, comprising: a main body provided with a front wheel and a rear wheel; a work unit provided on the main body; a work motor that drives the work unit; a travel motor that rotates the rear wheel; a handle provided on the main body to extend rearward and upward; a posture detection means that detects a rearward tilted state of the main body in which the rear wheel is in contact with a ground and the front wheel is spaced from the ground; and a control unit that drive-controls the work motor and the travel motor, wherein when the main body is in the rearward tilted state, the control unit causes a rotational speed of the travel motor to be reduced compared to when the front wheel is in contact with the ground, or causes a rotational speed of the work motor to be reduced compared to when the front wheel is in contact with the ground.

According to this arrangement, when the rearward tilted state of the main body is detected, the rotational speed of the rear wheel is reduced, whereby the turning operation of the power equipment by the operator becomes easy, or when the rearward tilted state of the main body is detected, the rotational speed of the blade is reduced, whereby the noise caused by the blade is reduced.

Further, in the above arrangement, preferably, the posture detection means includes a tilt angle detection means that detects a tilt angle of the main body about a lateral axis, and when the tilt angle is greater than or equal to a predetermined tilt angle determination value, the control unit causes the speed of the travel motor to be reduced compared to when the tilt angle is smaller than the tilt angle determination value.

According to this arrangement, the rearward tilted state of the main body is detected based on the tilt angle detected by the tilt angle detection means.

Further, in the above arrangement, preferably, the posture detection means includes a tilt angle detection means that detects a tilt angle of the main body about a lateral axis, and during a period from when the tilt angle becomes greater than or equal to a predetermined tilt angle determination value and a change rate of the tilt angle becomes greater than or equal to a predetermined change rate determination value to when the tilt angle becomes smaller than or equal to a predetermined restoration determination value, the control unit causes the speed of the travel motor to be reduced compared to when the tilt angle is smaller than the tilt angle determination value.

According to this arrangement, when it is determined whether the power equipment is in a state in which the rotational speed of the travel motor should be reduced, it is possible to take into account the background when the main body is placed into the tilted state because not only the tilt angle but also the change rate of the tilt angle is taken into account. For instance, in a case where the operator pushes down the handle and the main body is tilted thereby, the change rate of the tilt angle of the main body is large, and accordingly, the rotational speed of the travel motor is reduced. On the other hand, in a case where the ground on which the main body travels is sloped and the main body tilts gradually as a result of travel of the main body on the ground such that the tilt angle becomes greater than or equal to the tilt angle determination value, the rotational speed of the travel motor is not reduced.

Further, in the above arrangement, preferably, the tilt angle detection means is an acceleration sensor that outputs a signal corresponding to an acceleration, and the control unit performs low-pass filtering process on the signal from the acceleration sensor to remove at least a portion of the signal corresponding to a dynamic component of the acceleration, and calculates the tilt angle based on the signal that has been subjected to the filtering process.

According to this arrangement, the tilt angle detection means can be made compact and simple.

Further, in the above arrangement, preferably, the power equipment further comprises an operation input means that inputs a signal corresponding to an operation by an operator to the control unit, wherein the control unit drive-controls the travel motor according to the signal from the operation input means, and changes a filter used in the low-pass filtering process according to the signal from the operation input means.

According to this arrangement, when it is determined based on the operation signal from the operation input means that the travel motor is under acceleration or deceleration and a fore-and-aft acceleration is generated in the main body, the filter is changed such that the dynamic component of the acceleration detected by the acceleration sensor is removed even more reliably.

Further, in the above arrangement, preferably, the control unit increases a removal ratio of a high-frequency component of the signal from the acceleration sensor by changing the filter when acceleration or deceleration of the travel motor is determined based on the signal from the operation input means.

According to this arrangement, when it is determined that the travel motor is under acceleration or deceleration and a fore-and-aft acceleration is generated in the main body, the dynamic component of the acceleration detected by the acceleration sensor is removed even more reliably.

Further, in the above arrangement, preferably, the posture detection means includes a load detection means that detects a downward load applied to the handle, and when the load is greater than or equal to a predetermined load determination value, the control unit causes the speed of the travel motor to be reduced compared to when the load is smaller than the load determination value.

According to this arrangement, the rearward tilted state of the main body can be detected based on the downward load applied to the handle.

Further, in the above arrangement, preferably, the posture detection means includes a load detection means that detects a downward load applied to the handle and a tilt angle detection means that detects a tilt angle of the main body about a lateral axis, and when the load is greater than or equal to a predetermined load determination value and the tilt angle is greater than or equal to a predetermined tilt angle determination value, the control unit causes the speed of the travel motor to be lowered compared to when the load is smaller than the load determination value or the tilt angle is smaller than the tilt angle determination value.

According to this arrangement, the rearward tilted state of the main body can be detected even more reliably based on the downward load applied to the handle and the tilt angle of the main body.

Effect of the Invention

According to the foregoing arrangement, the turning operation of the walk-behind lawn mower becomes easy.

MODES FOR CARRYING OUT THE INVENTION

In the following, an embodiment in which power equipment according to the present invention is applied to a walk-behind electric lawn mower will be described with reference to FIGS. 1 to 7.

(Outline of Structure of Electric Lawn Mower)

Figure 1:
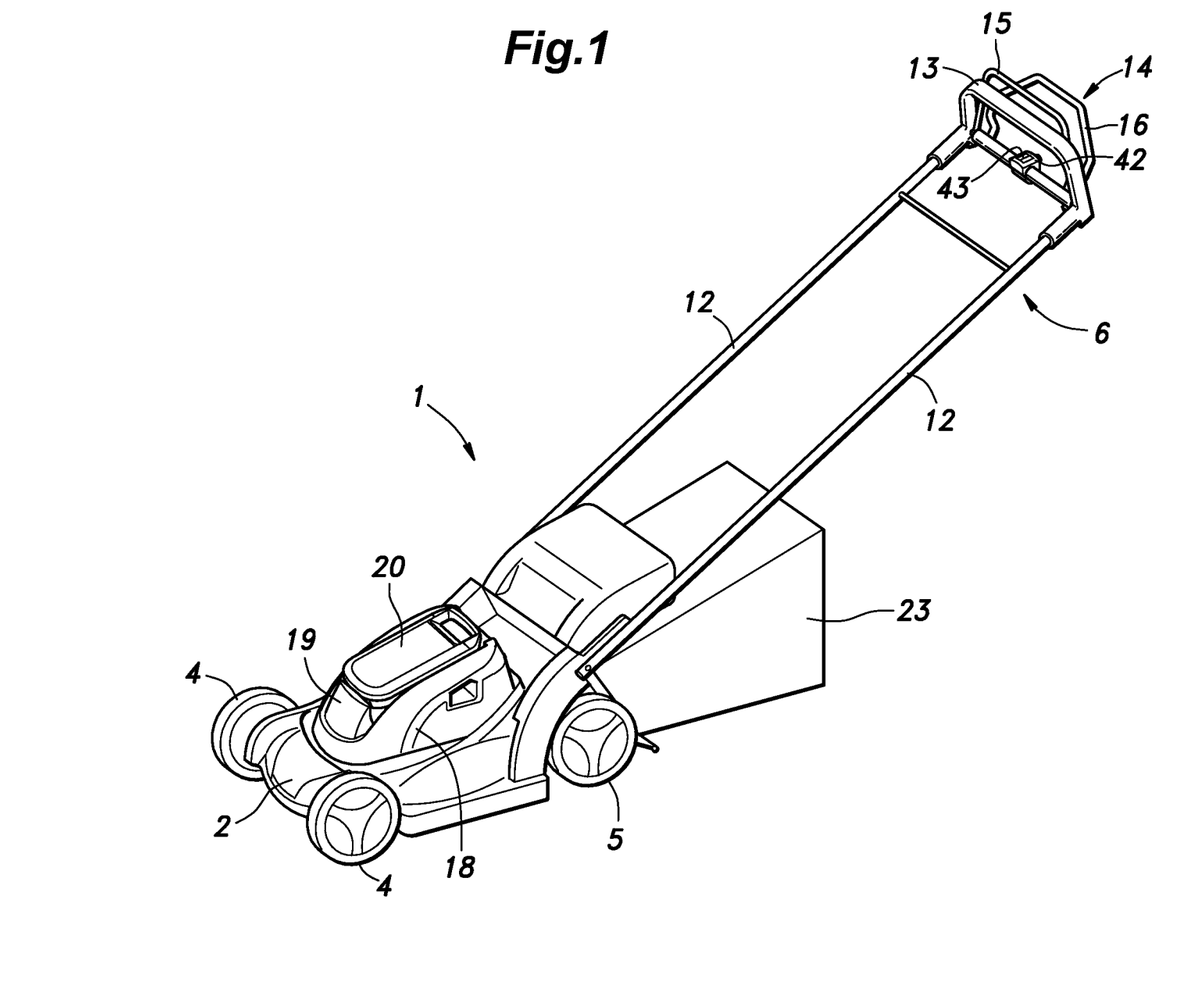
FIG. 1 is a perspective view of an electric lawn mower according to an embodiment.
Figure 2:
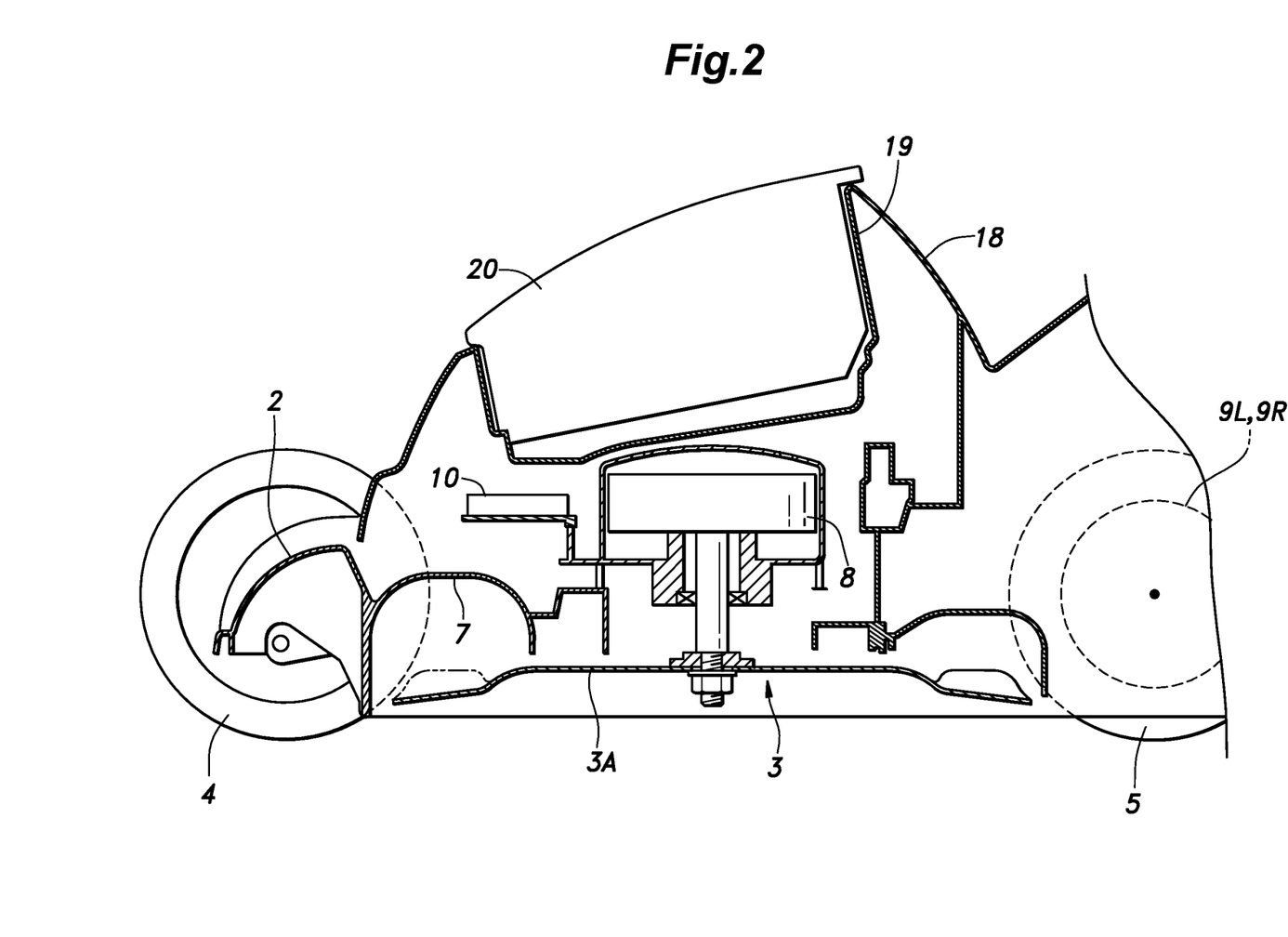
FIG. 2 is a sectional view of the electric lawn mower according to the embodiment.

As shown in FIGS. 1 and 2, an electric lawn mower 1 according to the present embodiment includes a main body 2, a work unit 3 provided in a lower part of the main body 2, a pair of left and right front wheels 4 and a pair of left and right rear wheels 5 rotatably supported on the main body 2, and a handle 6 extending rearward and upward from the main body 2. The work unit 3 is provided with a recess 7 that opens out downward at the center of the lower part of the main body 2 and a blade 3A that is rotatably disposed in the recess 7 and serves as a lawn mowing blade. Supported on the main body 2 are a work motor 8 having a rotation output shaft coupled to the blade 3A and a pair of left and right travel motors 9L and 9R for driving the left and right rear wheels 5, respectively. The work motor 8 and the travel motors 9L and 9R are electric motors, and the main body 2 is provided with a control unit 10 for controlling the motors 8, 9L and 9R.

The handle 6 includes a pair of side bars 12 extending upward and rearward from either side of a rear part of the main body 2 and a frame-shaped grip 13 connecting the rear ends of the side bars 12 to each other. The grip 13 of the handle 6 is provided with an operation input unit 14 for receiving an input operation by an operator. The operation input unit 14 is provided with a travel lever 15 for operating the travel motors 9L and 9R and a work lever 16 for operating the work motor 8.

The upper part of the main body 2 is provided with an upper cover 18 that covers the work motor 8, the left and right travel motors 9L and 9R, and the control unit 10. A battery 20 for supplying electric power to the motors 8 and 9 and the control unit 10 is detachably received in a battery tray 19 formed by recessing the upper surface of the upper cover 18.

The main body 2 is formed with a passage (not shown) extending from the recess 7 to the rear side of the main body 2, and a grass bag 23 is provided to close an open end of the passage. The grass cut by the blade 3A is discharged from the recess 7 to the rear through the passage, and collected in the grass bag 23.

(Control Unit)

Figure 3:
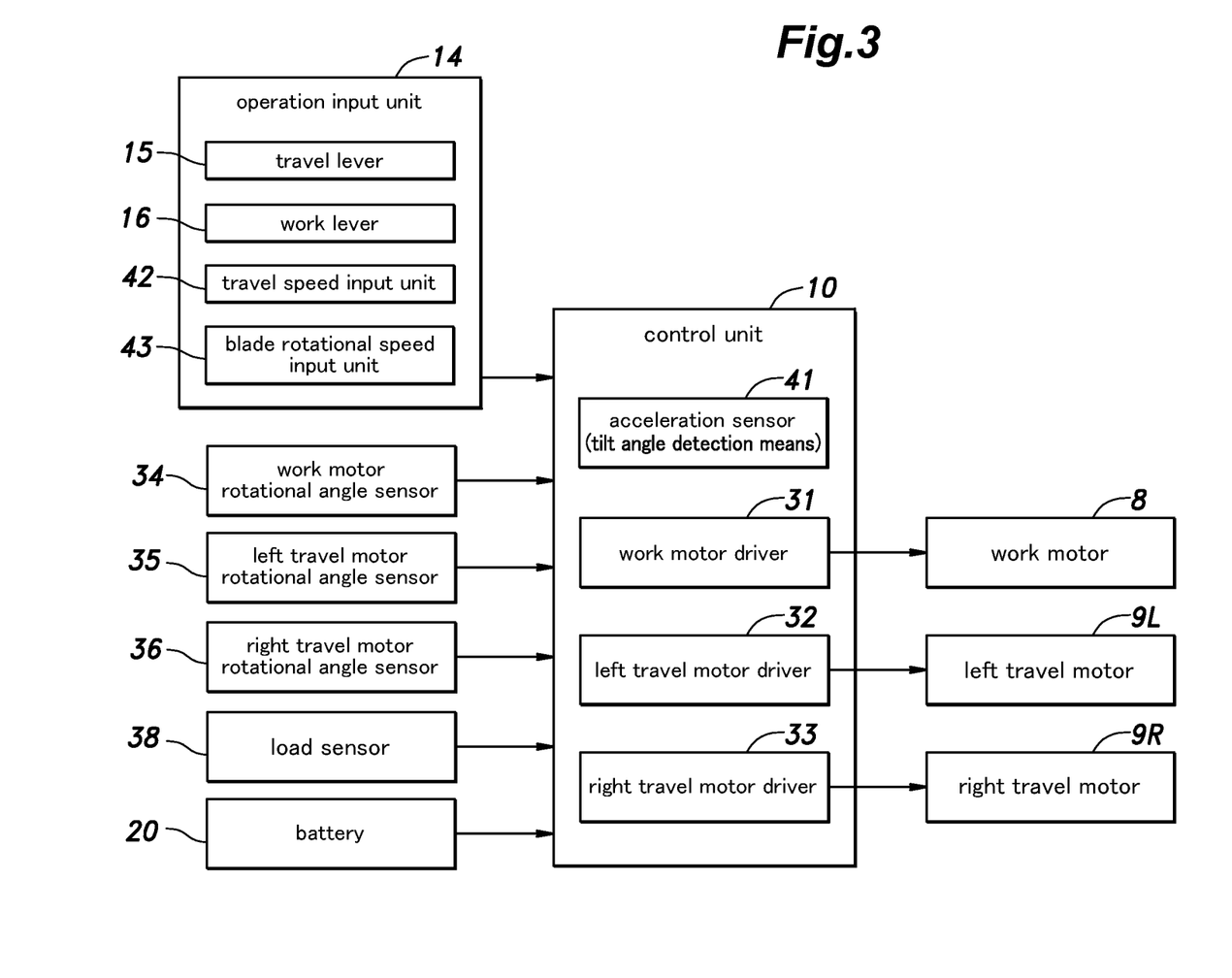
FIG. 3 is a block diagram showing a structure of a control unit.

The control unit 10 consists of an electronic control circuit (ECU) constituted of a microcomputer, ROM, RAM, a peripheral circuit, an input/output interface, drivers and the like. As shown in FIG. 3, the control unit 10 is connected to the battery 20 and receives power supply from the battery 20. The control unit 10 is provided with motor drivers 31, 32 and 33 corresponding to the work motor 8 and the left and right travel motors 9L and 9R, respectively. The control unit 10 causes the electric power to be supplied from the battery 20 to the motors 8, 9L and 9R via the motor drivers 31 to 33, and controls the motors 8, 9L and 9R. For instance, the control unit 10 changes the electric voltages provided to the motors 8, 9L and 9R by controlling the respective motor drivers 31, 32 and 33 according to PWM control, to thereby changes the rotational speeds of the motors 8, 9L and 9R.

The work motor 8 and the left and right travel motors 9L and 9R are provided with respective rotational angle sensors 34, 35 and 36 for detecting the rotational angles of the corresponding motors 8, 9L and 9R. The rotational angle sensors 34, 35 and 36 output signals corresponding to the rotational angles of the respective motors 8, 9L and 9R to the control unit 10, and the control unit 10 acquires the rotational speeds of the work motor 8 and the left and right travel motors 9L and 9R according to the signals.

The main body 2 is provided with a load sensor 38 (load detection means) that detects a downward load applied to the handle 6. The load sensor 38 may be a known strain gauge. The handle 6 is joined to the main body 2 so as to be movable slightly, and the load sensor 38 is interposed between the main body 2 and a front end of the side bar 12 of the handle 6. The load sensor 38 is arranged such that as the operator pushes down the grip 13 of the handle 6 downward, the load detected thereby is increases. The load sensor 38 outputs a signal corresponding to the downward load applied to the handle 6 to the control unit 10, and based on the signal, the control unit 10 acquires the downward load applied to the handle 6.

The control unit 10 includes an acceleration sensor 41 serving as a tilt angle detection means. For instance, the acceleration sensor 41 is a semiconductor device formed on the board of the control unit 10, and is preferably formed using MEMS technology. The acceleration sensor 41 may be an acceleration sensor of capacitance type, piezoelectric type or the like. The acceleration sensor 41 is a 3-axis acceleration sensor that outputs signals corresponding to accelerations of the main body 2 in the fore and aft direction (X axis), the lateral direction (Y axis), and the vertical direction (Z axis). The signals output from the acceleration sensor 41 includes a low-frequency static component (DC acceleration) attributed to gravity acceleration and a high-frequency dynamic component (AC acceleration) attributed to movement of the main body 2.

The control unit 10 detects a posture of the main body 2 based on the signal from at least one of the acceleration sensor 41 and the load sensor 38. Each of the acceleration sensor 41 and the load sensor 38 constitutes a posture detection means.

The travel lever 15 and the work lever 16 are each pivotally attached to the handle 6 such that the grip of each lever is movable between an initial position where the grip is spaced from the grip 13 of the handle 6 and an operation position where the grip is located close to the grip 13 of the handle 6. The operation input unit 14 outputs a travel command signal corresponding to the position of the travel lever 15 to the control unit 10, and outputs a blade rotation command signal corresponding to the position of the work lever 16 to the control unit 10. The travel command signal has a value corresponding to 0% when the travel lever 15 is in the initial position and a value corresponding to 100% when the travel lever 15 is in the operation position, where the value of the travel command signal increases gradually from the initial position to the operation position. Similarly, the blade rotation command signal is a value corresponding to 0% when the work lever 16 is in the initial position and a value corresponding to 100% when the work lever 16 is in the operation position, where the value of the blade rotation command signal increases gradually from the initial position to the operation position. In lawn mowing operation, the operator grasp the grips of the travel lever 15 and the work lever 16 together with the grip 13 of the handle 6 to place the travel lever 15 and the work lever 16 in the operation position.

The operation input unit 14 is provided with a travel speed input unit 42 for accepting an input operation by an operator regarding the travel speed of the electric lawn mower 1. The travel speed input unit 42 may consist of a lever, a dial, or the like that can be displaced with respect to the main body of the operation input unit 14, and the operation input unit 14 outputs a signal corresponding to the position of the travel speed input unit 42 to the control unit 10. Based on the signal from the operation input unit 14, the control unit 10 acquires a commanded rotational speed of the travel motors 9L and 9R corresponding to the travel speed desired by the operator.

The operation input unit 14 is provided with a blade rotational speed input unit 43 for accepting an input operation by the operator regarding the rotational speed of the blade 3A. The blade rotational speed input unit 43 may consist of a lever, a dial, a push button, or the like that can be displaced with respect to the main body of the operation input unit 14, and the operation input unit 14 outputs a signal corresponding to the position of the blade rotational speed input unit 43 to the control unit 10. Based on the signal from the operation input unit 14, the control unit 10 acquires a commanded rotational speed of the work motor 8 corresponding to the blade rotational speed desired by the operator.

Next, with reference to FIGS. 4 to 6, description will be made of the control performed by the control unit 10. The control unit 10 performs drive control shown in FIG. 4, tilt angle calculation control shown in FIG. 5, and rotational speed coefficient calculation shown in FIG. 6 in parallel.

Figure 4:
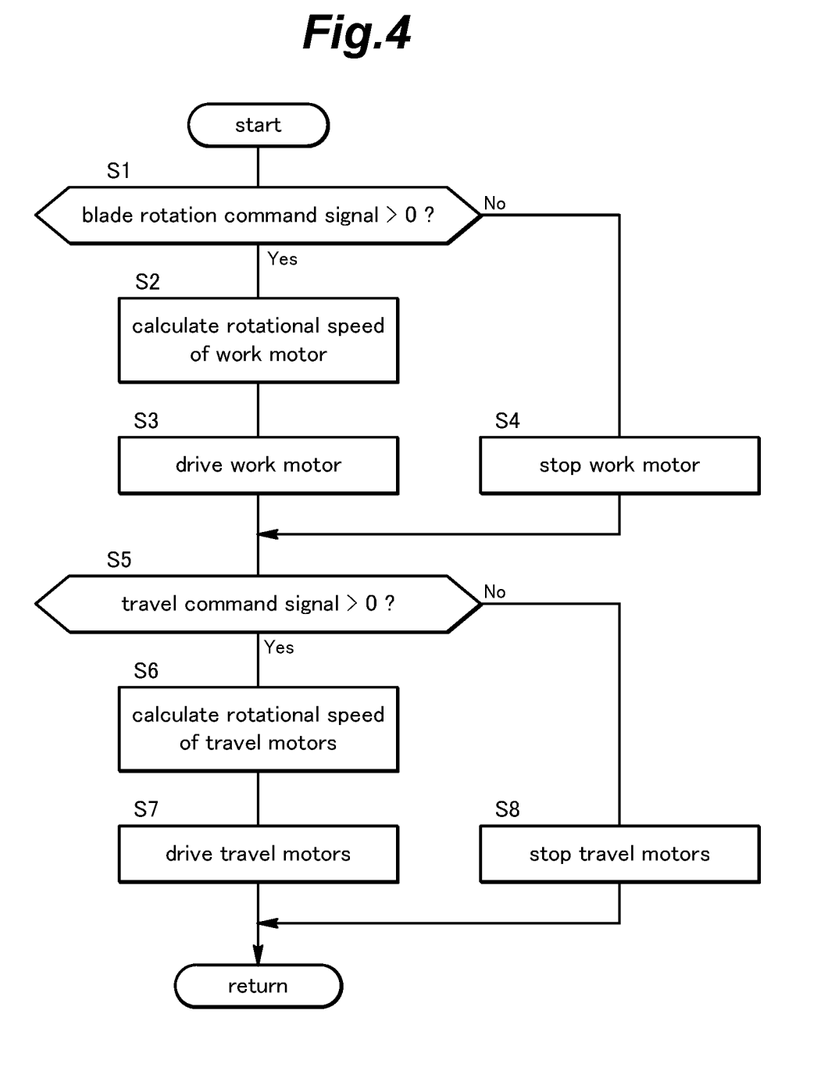
FIG. 4 is a flowchart showing a procedure of drive control.

In the drive control shown in FIG. 4, the control unit 10 first determines whether the value of the blade rotation command signal Kb is greater than 0% (step S1). If the value of the blade rotation command signal is greater than 0% (the blade rotation command signal is ON), the control unit 10 calculates a target rotational speed Rb_t of the work motor 8 in step S2. The target rotational speed Rb_t of the work motor 8 is calculated by multiplying the commanded rotational speed Rb_r of the work motor 8 by the value of the blade rotation command signal Kb and a rotational speed coefficient K1, which is calculated in a later-described rotational speed coefficient calculation (FIG. 6) (Rb_t=Rb_r×Kb×K1). The rotational speed coefficient K1 is a value greater than 0 and less than or equal to 1.

In step S3 that follows step S2, the control unit 10 controls the work motor driver 31 according to the target rotational speed Rb_t of the work motor 8 to thereby drive the work motor 8. At this time, the control unit 10 performs feedback control based on the signal from the work motor rotational angle sensor 34 such that the rotational speed of the work motor 8 coincides with the target rotational speed Rb_t.

If it is determined in step S1 that the value of the blade rotation command signal is 0% (the blade rotation command signal is OFF), the control unit 10 proceeds to step S4 and stops the work motor 8.

In step S5 that follows step S3 or S4, the control unit 10 determines whether the value of the travel command signal is greater than 0%. If the value of the travel command signal is greater than 0% (the travel command signal is ON), the control unit 10 calculates a target rotational speed Rs_t of the travel motors 9L and 9R in step S6. The target rotational speed Rs_t of the travel motors 9L and 9R is calculated by multiplying the commanded rotational speed Rs_r of the travel motors 9L and 9R by the value of the travel command signal Ks and the rotational speed coefficient K1 (Rs_t=Rs_r×Ks×K1).

In step S7 that follows step S6, the control unit 10 controls the travel motor drivers 32, 33 according to the target rotational speed Rs_t of the travel motors 9L and 9R to thereby drive the travel motors 9L and 9R. At this time, the control unit 10 performs feedback control based on the signals from the travel motor rotational angle sensors 35, 36 such that the rotational speed of the travel motors 9L and 9R coincides with the target rotational speed Rs_t.

If it is determined in step S5 that the value of the travel command signal is 0% (the travel command signal is OFF), the control unit 10 proceeds to step S8 and stops the travel motors 9L and 9R. After performing the process in step S7 or S8, the control unit 10 proceeds to the return step, and repeats the drive control.

Figure 5:
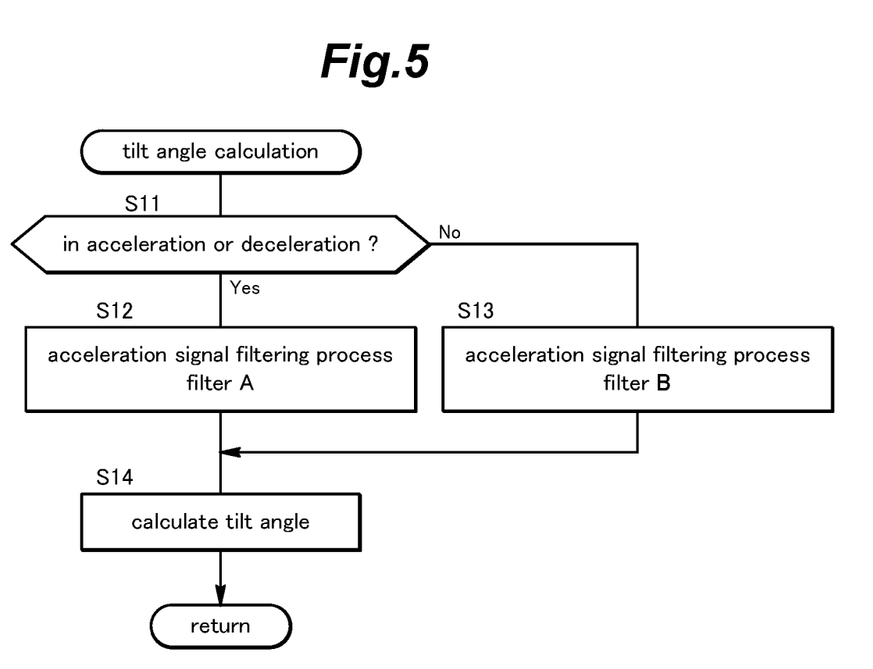
FIG. 5 is a flowchart showing a procedure of tilt angle calculation.

In the tilt angle calculation shown in FIG. 5, the control unit 10 first determines whether or not the travel motors 9L and 9R are in acceleration or deceleration (step S11). In the present embodiment, the control unit 10 performs the determination in step S11 based on the value of the travel command signal. Specifically, the control unit 10 determines whether it is in a predetermined period from detection of an increase or decrease of the value of the travel command signal. In the aforementioned step S5, the rotational speed of the travel motors 9L and 9R is controlled based on the value of the travel command signal, and therefore, it can be determined that the travel motors 9L and 9R are in acceleration or deceleration during the predetermined period from an increase or decrease of the value of the travel command signal.

If it is determined in step S11 that the main body 2 is in acceleration or deceleration (Yes), the control unit 10 performs a low-pass filtering process on the signal from the acceleration sensor 41 by use of a low-pass filter A in step S12, and if it is determined in step S11 that the main body 2 is not in acceleration or deceleration (No), the control unit 10 performs a low-pass filtering process on the signal from the acceleration sensor 41 by use of a low-pass filter B in step S13. The control unit 10 may perform a moving average process the signal from the acceleration sensor 41 before or after the low-pass filtering process in steps S12 and S13. Owing to the low-pass filtering process in steps S12 and S13, a part of the dynamic component of the acceleration, which is a high-frequency component, is removed from the signal from the acceleration sensor 41, so that the static component attributed to gravity is extracted. The low-pass filter A used in step S12 is designed to have a cutoff frequency lower than that of the low-pass filter B used in step S12, and hence has a higher removal ratio of the high-frequency component. Namely, by use of the low-pass filter A, the removal ratio of the dynamic component corresponding to the high-frequency component in the signal from the acceleration sensor 41 is increased compared to the case where the low-pass filter B is used, whereby the dynamic component of the acceleration attributed to travel of the main body 2 is removed even more reliably.

In step S14 that follows steps S12 and S13, based on the signal from the acceleration sensor 41 that has been subjected to the low-pass filtering process to extract the static component of the acceleration, the control unit 10 calculates a tilt angle of the main body 2 about the lateral axis (Y axis) with respect to a horizontal plane (pitch angle). For instance, the calculation of the tilt angle may be preferably performed by multiplying the value of the signal of the acceleration sensor 41 by a predetermined coefficient based on a relationship between the value of the signal of the acceleration sensor 41 and the tilt angle that has been confirmed beforehand. After performing the process in step S14, the control unit 10 proceeds to the return step and repeats the tilt angle calculation control.

Figure 6:
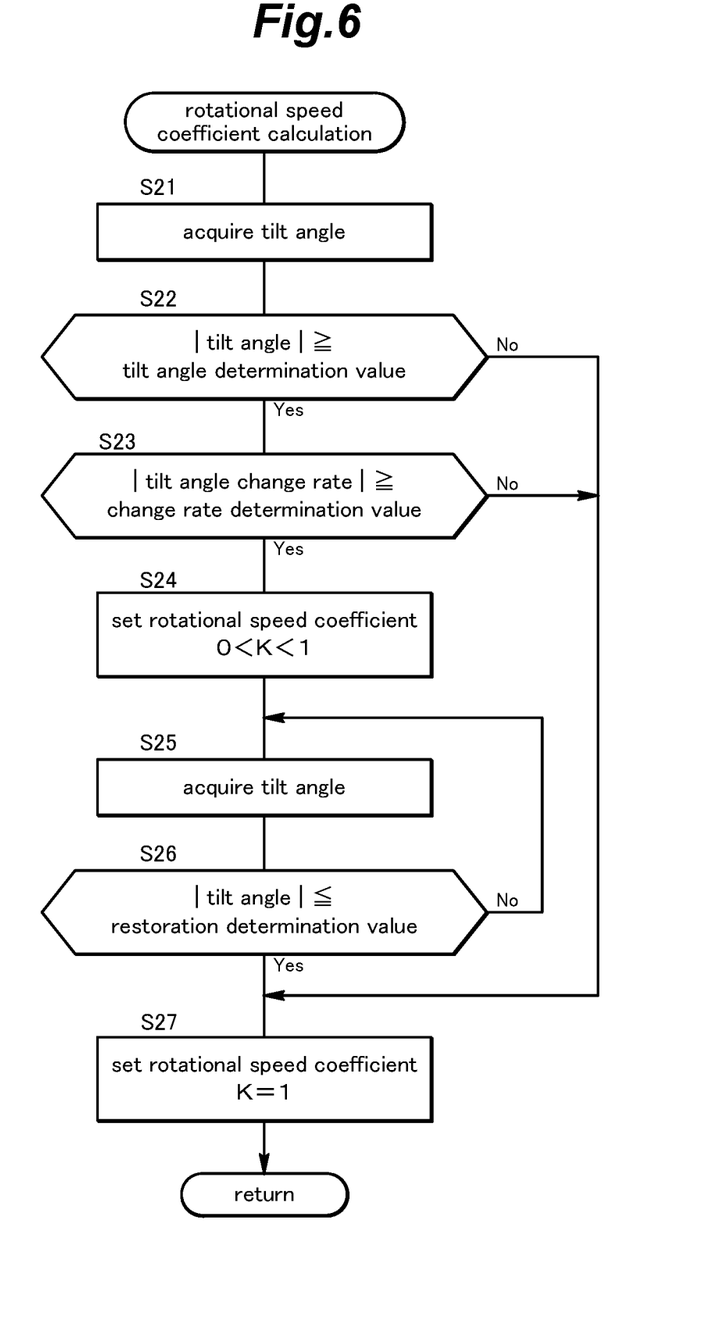
FIG. 6 is a flowchart showing a procedure of rotational speed coefficient calculation according to the first embodiment.

In the rotational speed coefficient calculation shown in FIG. 6, in first step S21, the control unit 10 acquires the tilt angle calculated in the tilt angle calculation control. In subsequent step S22, the control unit 10 determines whether the absolute value of the tilt angle is greater than or equal to a predetermined tilt angle determination value. The tilt angle determination value is preferably set to a value that enables determination of whether the main body 2 is in a rearward tilted state in that the rear wheels 5 are in contact with the ground and the front wheels 4 are spaced from the ground; for example, 5-70 degrees.

If the determination result in step S22 is Yes, the control unit 10 determines in step S23 whether the absolute value of a change rate of the tilt angle is greater than or equal to a predetermined change rate determination value. The absolute value of the change rate of the tilt angle is relatively large when the main body 2 is intentionally placed into the rearward tilted state by the operator by pressing down the handle 6, and is relatively small when the tilt angle changes gradually as a result of travel of the electric lawn mower 1 on the sloping ground, and the change rate determination value is set to allow them to be distinguished from each other. If the determination result in step S23 is Yes, the control unit 10 sets the rotational speed coefficient K1 to a predetermined value greater than 0 and smaller than 1 in step S24.

In step S25 that follows step S24, the control unit 10 acquires again the tilt angle calculated in the tilt angle calculation control to update the tilt angle. In step S26 that follows step S25, the control unit determines whether the absolute value of the tilt angle is smaller than or equal to a predetermined restoration determination value. The restoration determination value is preferably set to a value smaller than or equal to the tilt angle determination value; for example, 1-10 degrees. If the determination result in step S26 is No, the control unit 10 returns to step S25, and repeats the process of steps S25 and S26 until the determination result in step S26 becomes Yes.

If the determination result in step S26 is Yes, the determination result in step S22 is No, or the determination result in step S23 is No, the control unit 10 sets the rotational speed coefficient K1 to 1 in step S27. After performing the process in step S27, the control unit 10 proceeds to the return step, and repeats the rotational speed coefficient calculation.

With the control unit 10 performing the control flow shown in FIGS. 4 to 6, the electric lawn mower 1 operates as follows. When the work lever 16 is moved to the operation position side or is turned on by the operator, the work motor 8 is driven and the blade 3A is rotated so that the electric lawn mower 1 can perform lawn mowing. When the travel lever 15 is moved to the operation position side or is turned on, the travel motors 9L and 9R are driven and the rear wheels 5 are rotated so that the electric lawn mower 1 can move forward. In normal lawn mowing operation, the operator grasps the grips of the travel lever 15 and the work lever 16 together with the grip 13 of the handle 6 to place the travel lever 15 and the work lever 16 in the operation position.

The rotational speed of the travel motors 9L and 9R, which corresponds to the travel speed of the electric lawn mower 1, is determined based on the commanded rotational speed $Rs\_r$ of the travel motors 9L and 9R set by an operation of the travel speed input unit 42 by the operator, the travel command signal $Ks$ corresponding to the position of the travel lever 15, and the rotational speed coefficient $K1$. Similarly, the rotational speed $Rb\_t$ of the work motor 8, which corresponds to the rotational speed of the blade 3A, is determined based on the commanded rotational speed $Rb\_r$ of the work motor 8 set by an operation of the blade rotational speed input unit 43 by the operator, the blade rotation command signal $Kb$ corresponding to the position of the work lever 16, and the rotational speed coefficient $K1$.

If the absolute value of the tilt angle of the main body 2 of the electric lawn mower 1 calculated based on the detection signal of the acceleration sensor 41 is smaller than the predetermined tilt angle determination value, the control unit 10 determines that the lawn mower 1 is in a normal state in which the front wheels 4 and the rear wheels 5 are in contact with the ground, and sets the rotational speed coefficient $K1$ to 1.

On the other hand, if the absolute value of the tilt angle is greater than or equal to the tilt angle determination value and the absolute value of the change rate of the tilt angle is greater than or equal to the predetermined change rate determination value, the control unit 10 sets the rotational speed coefficient $K1$ to a value greater than 0 and smaller than 1 (steps S22-S24). If the absolute value of the tilt angle of the main body 2 is greater than or equal to the tilt angle determination value, it is determined that the main body 2 is in the rearward tilted state, and if the absolute value of the change rate of the tilt angle is greater than or equal to the change rate determination value, it is determined that the rearward tilted state has been caused by pressing down of the handle 6 by the operator. Therefore, if the absolute value of the tilt angle is greater than or equal to the tilt angle determination value and the absolute value of the change rate of the tilt angle is greater than or equal to the predetermined change rate determination value, it can be determined that the main body 2 has been placed into the rearward tilted state by pressing down of the handle 6 by the operator, namely, the operator has intentionally lifted the front wheels 4 from the ground to turn the main body 2, i.e., the main body 2 is in the turning state. In such a case as when the mower is operated on slopes, the tilt angle of the main body 2 gradually increases, and the change rate of the tilt angle does not become greater than or equal to the change rate determination value, and therefore, it can be distinguished from the turning state.

When the control unit 10 determines the turning state of the main body 2 by the process of steps S22-S24, the rotational speed coefficient is set to a value greater than 0 and smaller than 1 (step S25), and therefore, the target rotational speed $Rb\_t$ of the work motor 8 and the target rotational speed $Rs\_t$ of the travel motors 9L and 9R are reduced compared to the normal state in which $K1$ is 1. Consequently, in the turning state the rotational speed of the travel motors 9L and 9R is reduced, whereby the turning operation of the electric lawn mower 1 by the operator becomes easy. In addition, in the turning state the rotational speed of the work motor 8 is reduced, and therefore, the noise caused by the blade 3A can be suppressed even if the blade 3A is exposed to outside as a result of rearward tilt of the main body 2.

The reduction of speed of the work motor 8 and the travel motors 9L and 9R in the turning state is maintained until the tilt angle of the main body 2 becomes small and the absolute value of the tilt angle becomes less than or equal to the restoration determination value (steps S25-S27).

The control unit 10 determines acceleration or deceleration of the main body 2 in the fore and aft direction, and when it is in acceleration or deceleration, lowers the cutoff frequency of the filter used in the low-pass filtering process than when it is stopped or traveling at a constant speed (steps S11-S13). Thereby, the dynamic component in the acceleration detected by the acceleration sensor 41 is removed reliably, and the calculation of the tilt angle based on the static component is made possible. The control unit 10 detects whether or not the main body 2 is in acceleration or deceleration in the fore and aft direction based on the change in the travel command signal, and therefore, prompt response is achieved and accuracy of the calculation of the tilt angle is improved.

Next, description will be made of an electric lawn mower 1 according to second to fourth embodiments which are partly modified from the foregoing embodiment. The electric lawn mower 1 according to the second to fourth embodiments differs from the electric lawn mower 1 according to the first embodiment only with respect to the rotational speed coefficient calculation performed by the control unit 10.

Figure 7:
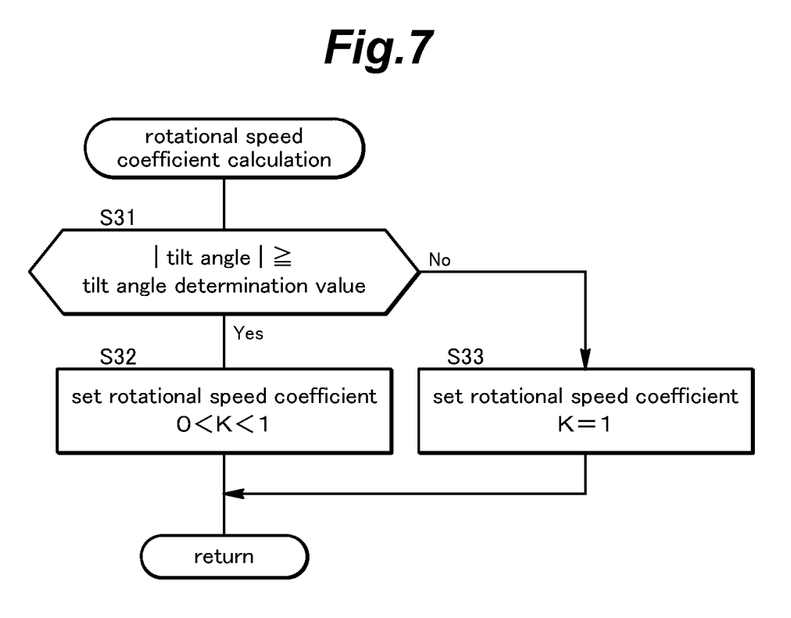
FIG. 7 is a flowchart showing a procedure of rotational speed coefficient calculation according to the second embodiment.

As shown in FIG. 7, the control unit 10 according to the second embodiment determines whether or not the absolute value of the tilt angle is greater than or equal to the predetermined tilt angle determination value in first step S31 of the rotational speed coefficient calculation. If the determination result in step S31 is Yes, the control unit 10 sets the rotational speed coefficient $K1$ to a predetermined value greater than 0 and smaller than 1 in step S32, and if the determination result is No, the control unit 10 sets the rotational speed coefficient $K1$ to 1 in step S33. After performing the process of step S32 or S33, the control unit 10 proceeds to the return step and repeats the rotational speed coefficient calculation. Thus, in the rotational speed coefficient calculation, the rotational speed coefficient may be set based on only the tilt angle. In this case, the rotational speed coefficient calculation becomes simple.

Figure 8:
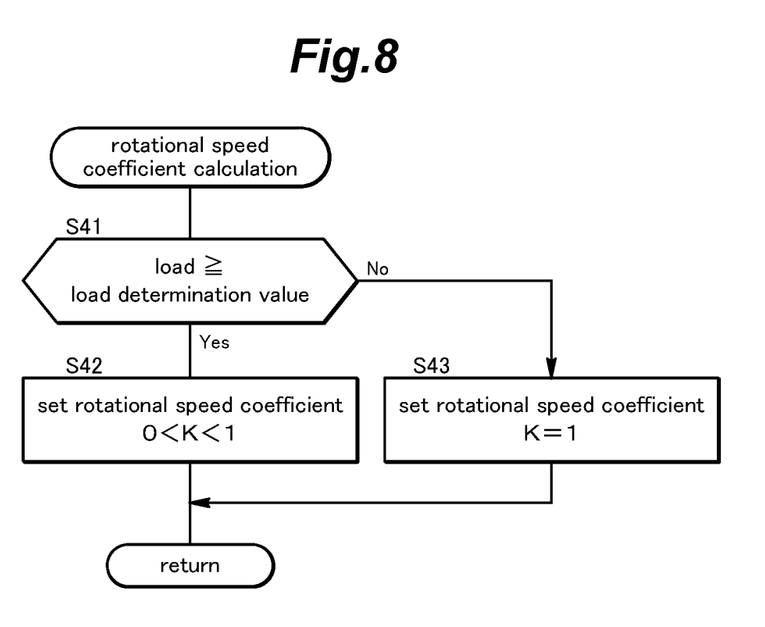
FIG. 8 is a flowchart showing a procedure of rotational speed coefficient calculation according to the third embodiment.

As shown in FIG. 8, the control unit 10 according to the third embodiment determines whether or not the downward load applied to the handle 6 detected by the load sensor 38 is greater than or equal to a predetermined load determination value in first step S41 of the rotational speed coefficient calculation. The load determination value is set such that when the load is greater than or equal to the load determination value, it is determined that the main body 2 is in the rearward tilted state. If the determination result in step S41 is Yes, the control unit 10 sets the rotational speed coefficient $K1$ to a predetermined value greater than 0 and smaller than 1 in step S42, and if the determination result is No, the control unit 10 sets the rotational speed coefficient $K1$ to 1 in step S43. After performing the process of step S42 or S43, the control unit 10 proceeds to the return step and repeats the rotational speed coefficient calculation. Thus, in the rotational speed coefficient calculation, the rotational speed coefficient may be set based on the downward load applied to the handle 6.

Figure 9:
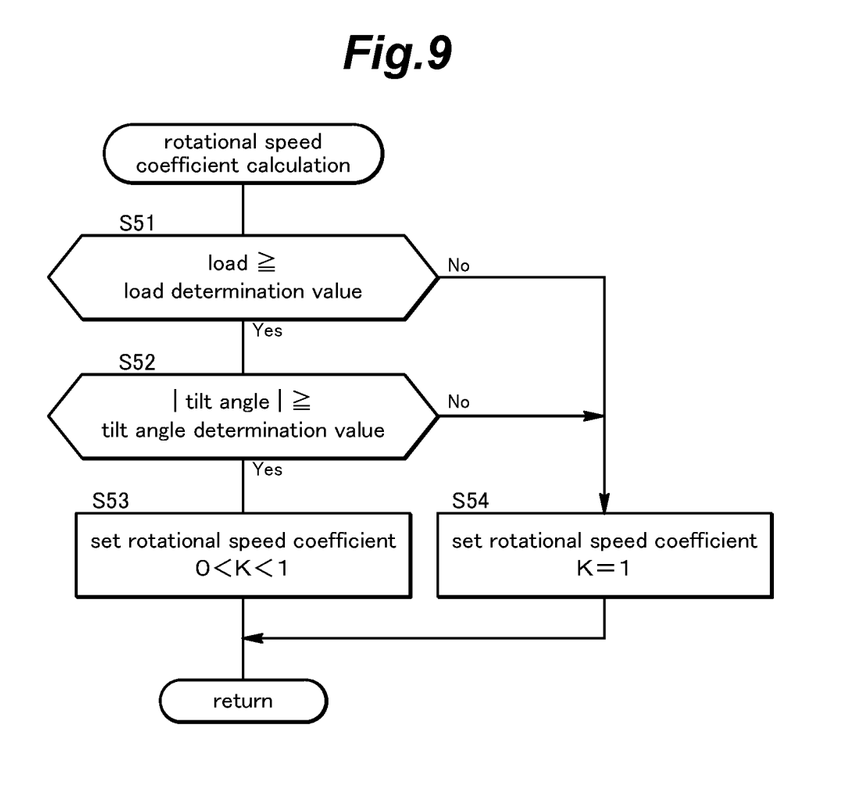
FIG. 9 is a flowchart showing a procedure of rotational speed coefficient calculation according to the fourth embodiment.

As shown in FIG. 9, the control unit 10 according to the fourth embodiment determines whether or not the downward load applied to the handle 6 detected by the load sensor 38 is greater than or equal to a predetermined load determination value in first step S51 of the rotational speed coefficient calculation. If the determination result in step S51 is Yes, the control unit 10 determines in step S52 whether or not the absolute value of the tilt angle is greater than or equal to the predetermined tilt angle determination value. If the determination result in step S52 is Yes, the control unit 10 sets the rotational speed coefficient K1 to a predetermined value greater than 0 and smaller than 1 in step S53. If the determination result in step S51 or S52 is No, the control unit 10 sets the rotational speed coefficient K1 to 1 in step S54. After performing the process of step S53 or S54, the control unit 10 proceeds to the return step and repeats the rotational speed coefficient calculation. Thus, in the rotational speed coefficient calculation, the rotational speed coefficient may be set based on the tilt angle and the downward load applied to the handle 6. In this case, the control unit 10 can detect the rearward tilted state of the main body 2 even more reliably.

A concrete embodiment of the present invention has been described in the foregoing, but the present invention is not limited to the embodiment and may be modified or altered in various ways. In the foregoing embodiment, the rotational speed coefficient K1 had a value common to the work motor 8 and the travel motors 9L and 9R, but the rotational speed coefficient K1 may be set to different values for the work motor 8 and the travel motors 9L and 9R.

Further, in the foregoing embodiment, the control unit 10 was configured such that when the rearward tilted state is detected, the control unit 10 reduces the target rotational speed by multiplying the rotational speed coefficient K1 having a value smaller than 1, but in another embodiment the control unit 10 may be configured such that when the rearward tilted state is detected, the control unit 10 sets a speed reduction amount, and reduces the target rotational speed by subtracting the speed reduction amount from the base value of the target rotational speed. Further, in another embodiment, the control unit 10 may be configured such that when the rearward tilted state is detected, the control unit 10 sets an upper-limit speed, and reduces the target rotational speed by setting the target rotational speed to the upper-limit speed.

In the foregoing embodiment, the present invention was exemplarily applied to the lawn mower, but the present invention can be similarly applied to a grass cutter, a snow blower, and a tiller. In the case of a grass cutter, the blade 3A should be replaced with a blade suitable for grass cutting, in the case of a snow blower, the blade 3A should be replaced with an auger suitable for snow removal, and in the case of a tiller, the blade 3A should be replaced with a tiller blade suitable for tilling.

GLOSSARY 1 electric lawn mower
2 main body
3 work unit
3A blade
4 front wheels
5 rear wheels
8 work motor
9L left travel motor
9R right travel motor
10 control unit
14 operation input unit
15 travel lever
16 work lever
20 battery
31 work motor driver
32 left travel motor driver
33 right travel motor driver
34 work motor rotational angle sensor
35 left travel motor rotational angle sensor
36 right travel motor rotational angle sensor
38 load sensor
41 acceleration sensor
42 travel speed input unit
43 blade rotational speed input unit

The invention claimed is:

1. A walk-behind power equipment, comprising:
a main body provided with a front wheel and a rear wheel;
a work unit provided on the main body;
a work motor that drives the work unit;
a travel motor that rotates the rear wheel;
a handle provided on the main body to extend rearward and upward;
a posture detector that detects a rearward tilted state of the main body in which the rear wheel is in contact with a ground and the front wheel is spaced from the ground; and
a control unit that drive-controls the work motor and the travel motor,
wherein when the main body is in the rearward tilted state, the control unit causes a rotational speed of the travel motor to be reduced compared to when the front wheel is in contact with the ground, or causes a rotational speed of the work motor to be reduced compared to when the front wheel is in contact with the ground,
the posture detector includes a tilt angle detector that detects a tilt angle of the main body about a lateral axis, and
during a period from when the tilt angle becomes greater than or equal to a predetermined tilt angle determination value and a change rate of the tilt angle becomes greater than or equal to a predetermined change rate determination value to when the tilt angle becomes smaller than or equal to a predetermined restoration determination value, the control unit causes the speed of the travel motor to be reduced compared to when the tilt angle is smaller than the tilt angle determination value.

2. The power equipment according to claim 1, wherein the tilt angle detector is an acceleration sensor that outputs a signal corresponding to an acceleration, and
the control unit performs a low-pass filtering process on the signal from the acceleration sensor to remove at least a portion of the signal corresponding to a dynamic component of the acceleration, and calculates the tilt angle based on the signal that has been subjected to the filtering process.

3. The power equipment according to claim 2, further comprising an operation inputter that inputs a signal corresponding to an operation by an operator to the control unit,
wherein the control unit drive-controls the travel motor according to the signal from the operation inputter, and changes a filter used in the low-pass filtering process according to the signal from the operation inputter.

4. The power equipment according to claim 3, wherein the control unit increases a removal ratio of a high-frequency component of the signal from the acceleration sensor by changing the filter when acceleration or deceleration of the travel motor is determined based on the signal from the operation inputter.

5. The power equipment according to claim 1, wherein the posture detector includes a load detector that detects a downward load applied to the handle, and
  when the load is greater than or equal to a predetermined load determination value, the control unit causes the speed of the travel motor to be reduced compared to when the load is smaller than the load determination value.

6. The power equipment according to claim 1, wherein the posture detector includes a load detector that detects a downward load applied to the handle and a tilt angle detector that detects a tilt angle of the main body about a lateral axis, and
  when the load is greater than or equal to a predetermined load determination value and the tilt angle is greater than or equal to a predetermined tilt angle determination value, the control unit causes the speed of the travel motor to be lowered compared to when the load is smaller than the load determination value or the tilt angle is smaller than the tilt angle determination value.

* * * * *